(12) United States Patent
Weber

(10) Patent No.: US 7,019,905 B2
(45) Date of Patent: Mar. 28, 2006

(54) MULTILAYER REFLECTOR WITH SUPPRESSION OF HIGH ORDER REFLECTIONS

(75) Inventor: Michael F. Weber, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 20 days.

(21) Appl. No.: 10/748,396

(22) Filed: Dec. 30, 2003

(65) Prior Publication Data

US 2005/0141093 A1    Jun. 30, 2005

(51) Int. Cl.
G02B 1/10    (2006.01)

(52) U.S. Cl. .............. 359/587; 359/359; 359/586; 359/589; 359/588

(58) Field of Classification Search ............ 359/584, 359/359, 586–590
See application file for complete search history.

(56) References Cited

U.S. PATENT DOCUMENTS

| | | |
|---|---|---|
| 0,540,768 A | 6/1895 | Western |
| 3,124,639 A | 3/1964 | Kahn |
| 3,247,392 A | 4/1966 | Thelen |
| 3,610,729 A | 10/1971 | Rogers |
| 3,711,176 A | 1/1973 | Alfrey, Jr. et al. |
| 3,860,036 A | 1/1975 | Newman, Jr. |
| 4,229,066 A | 10/1980 | Rancourt et al. |
| 4,446,305 A | 5/1984 | Rogers et al. |
| 4,520,189 A | 5/1985 | Rogers et al. |
| 4,521,588 A | 6/1985 | Rogers et al. |
| 4,525,413 A | 6/1985 | Rogers et al. |
| 4,720,426 A | 1/1988 | Englert et al. |
| 5,103,337 A | 4/1992 | Schrenk et al. |
| 5,188,760 A | 2/1993 | Hikmet et al. |
| 5,211,878 A | 5/1993 | Reiffenrath et al. |
| 5,235,443 A | 8/1993 | Barnik et al. |
| 5,269,995 A | 12/1993 | Ramanathan et al. |
| 5,294,657 A | 3/1994 | Melendy et al. |
| RE34,605 E | 5/1994 | Schrenk et al. |
| 5,316,703 A | 5/1994 | Schrenk |
| 5,319,478 A | 6/1994 | Fijnfschilling et al. |
| 5,360,659 A | 11/1994 | Arends et al. |
| 5,389,324 A | 2/1995 | Lewis et al. |
| 5,448,404 A | 9/1995 | Schrenk et al. |
| 5,486,935 A | 1/1996 | Kalmanash |
| 5,486,949 A | 1/1996 | Schrenk et al. |
| 5,612,820 A | 3/1997 | Schrenk et al. |
| 5,629,055 A | 5/1997 | Revol et al. |

(Continued)

FOREIGN PATENT DOCUMENTS

JP    07-244204    9/1995

(Continued)

Primary Examiner—Thong Nguyen
Assistant Examiner—Joshua L. Pritchett
(74) Attorney, Agent, or Firm—Milena G. Higgins; Stephen C. Jensen (57) ABSTRACT

A multilayer interference reflecting film has individual optical layers arranged to form optical repeat units throughout the film. Each of a plurality of optical repeat units has six individual layers, at least three of which have different refractive indices at a design wavelength $\lambda_0$. Individual layers having nominally the same refractive index and physical thickness, arbitrarily labeled "A", "B", "C", and "D", are arranged in a six-layer optical repeat unit in a cyclic permutation of CACDBD, where the A and B layers are each thicker than the C and D layers. The thicknesses and refractive indices of the individual layers can be selected to suppress the second, third, and fourth order reflections, while reflecting light at the design wavelength.

13 Claims, 4 Drawing Sheets

U.S. PATENT DOCUMENTS

| | | |
|---|---|---|
| 5,686,979 A | 11/1997 | Weber et al. |
| 5,699,188 A | 12/1997 | Gilbert et al. |
| 5,721,603 A | 2/1998 | De Vaan et al. |
| 5,744,534 A | 4/1998 | Ishiharada et al. |
| 5,751,388 A | 5/1998 | Larson |
| 5,767,935 A | 6/1998 | Ueda et al. |
| 5,770,306 A | 6/1998 | Suzuki et al. |
| 5,783,120 A | 7/1998 | Ouderkirk et al. |
| 5,793,456 A | 8/1998 | Broer et al. |
| 5,808,794 A | 9/1998 | Weber et al. |
| 5,825,542 A | 10/1998 | Cobb, Jr. et al. |
| 5,825,543 A | 10/1998 | Ouderkirk et al. |
| 5,882,774 A | 3/1999 | Jonza et al. |
| 5,940,149 A | 8/1999 | Vanderwerf |
| 5,962,114 A | 10/1999 | Jonza et al. |
| 5,965,247 A | 10/1999 | Jonza et al. |
| 6,049,419 A | 4/2000 | Wheatley et al. |
| 2001/0022982 A1 | 9/2001 | Neavin et al. |
| 2004/0145803 A1* | 7/2004 | Eisenkramer ............... 359/359 |

FOREIGN PATENT DOCUMENTS

| | | |
|---|---|---|
| JP | 07-244205 | 9/1995 |
| JP | 2003-302521 | 10/2003 |
| WO | WO 95/27919 | 4/1995 |
| WO | WO 95/17303 | 6/1995 |
| WO | WO 95/17691 | 6/1995 |
| WO | WO 97/01440 | 1/1997 |
| WO | WO 97/01774 | 1/1997 |
| WO | WO 99/36248 | 7/1999 |
| WO | WO 02/061469 | 8/2002 |

* cited by examiner

MULTILAYER REFLECTOR WITH SUPPRESSION OF HIGH ORDER REFLECTIONS

FIELD OF THE INVENTION

The present invention relates to multilayer interference films having a plurality of individual layers arranged in optical repeat units so as to reflect light at least at a first wavelength $\lambda_0$. The layers within the optical repeat units can be arranged so as to suppress reflectivity at higher orders, in particular at least the second order ($\lambda_0/2$), the third order ($\lambda_0/3$), and the fourth order ($\lambda_0/4$). Such films are of particular, but not exclusive, utility in infrared applications where high reflectivity in the infrared region is desired but low reflectivity/high transmission throughout the visible region is also desired.

BACKGROUND

Multilayer interference films are known. In such films, a multitude of individual layers are arranged in a repeating sequence, where the smallest repeating arrangement of layers is referred to as an optical repeat unit, sometimes also referred to as a unit cell. Adjacent individual layers have unequal refractive indices for at least one polarization state of light. The individual layers also have optical thicknesses—defined as the physical thickness multiplied by the refractive index of the individual layer—of less than a design wavelength $\lambda_0$ such that constructive or destructive interference for light components reflected at the interfaces between individual layers can occur to produce the desired overall reflectivity at $\lambda_0$. (Since a beam of light traveling through a material experiences a refractive index that can change with the polarization state, direction of travel, and wavelength of the light beam, the "effective refractive index" of the material, which takes these factors into account, can be used in this calculation.) In the simplest case, referred to as a quarter-wave stack, the prior art film comprises alternating layers of a relatively high refractive index material ("H") and a relatively low refractive index material ("L"), each of which have an optical thickness of $\lambda_0/4$. Each optical repeat unit of such a stack consists essentially of just two adjacent individual layers, one H and one L, and has an overall optical thickness of one-half of the design wavelength.

Figure 1:
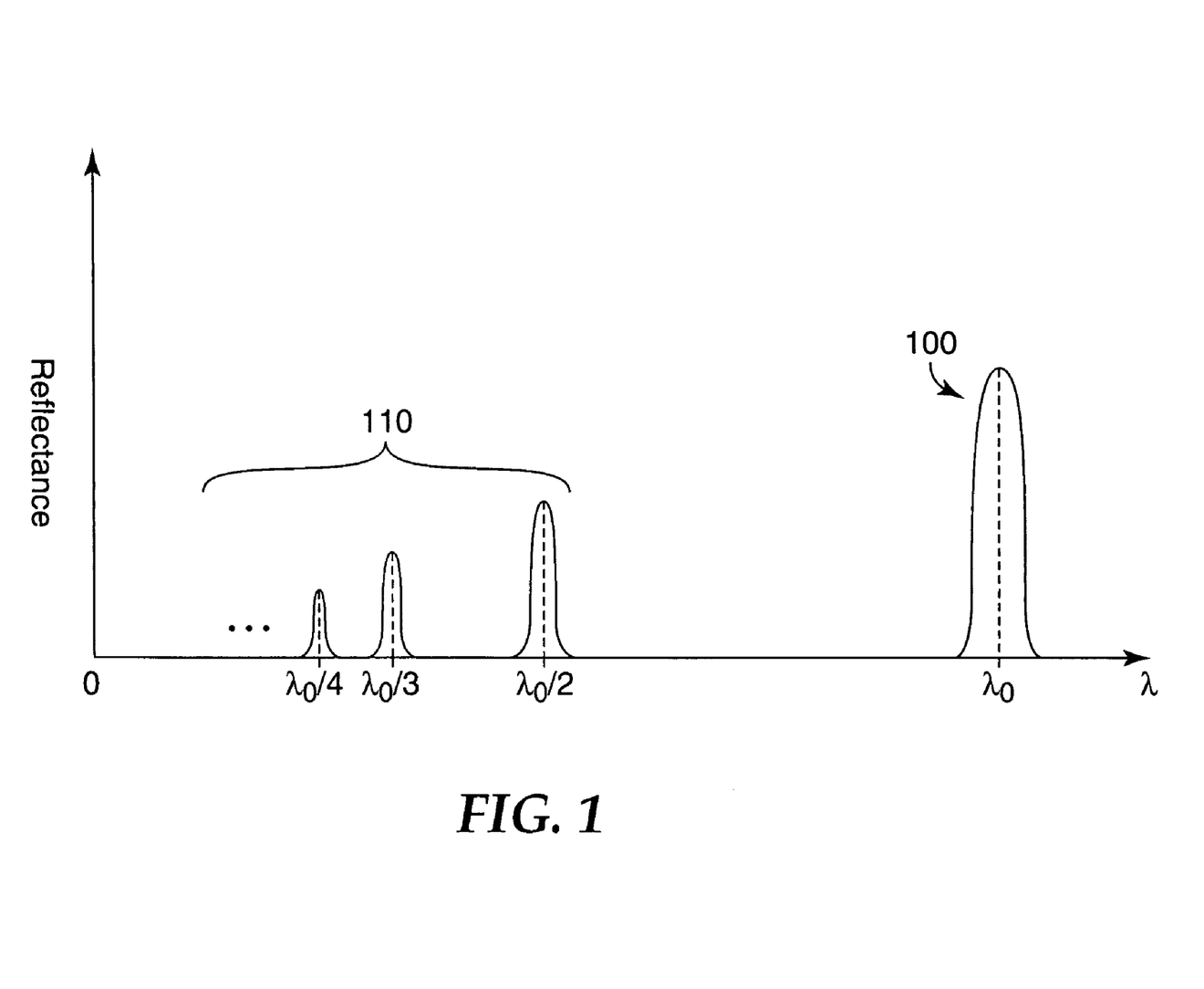
FIG. 1 is a simplified, idealized graph of reflectance versus wavelength, showing a reflectance band produced by a generalized multilayer stack, and showing the accompanying higher order reflectance bands.

Such a stack, however, not only reflects light at the design wavelength, but also at integer fractions of the design wavelength that are referred to herein as higher order reflection wavelengths shown generically in FIG. 1. In that figure, which plots in a simplified fashion normal incidence reflectance of a generalized optical stack versus wavelength on linear scales, a first order reflectance band 100 is seen at the design wavelength $\lambda_0$, a second order reflection peak is seen at $\lambda_0/2$, a third order peak is seen at $\lambda_0/3$, and a fourth order peak is seen at $\lambda_0/4$. Still higher orders, of course, also exist but are not shown. The higher order reflections, beginning with the second order, are shown generally at 110. A true quarter-wave stack has no even-order reflectance bands ($\lambda_0/2$, $\lambda_0/4$, $\lambda_0/6$, etc.) due to symmetry, but does have odd-order reflectance bands. If the H and L layer within a two-layer optical repeat unit have unequal optical thicknesses, the even-order reflectance bands will be nonzero.

The peak reflectance and the spectral width of the first order reflectance band 100 depends on the refractive indices $n_H$, $n_L$ of the H,L layers respectively at the design wavelength (and thus also on the refractive index difference $\Delta n = n_H - n_L$), and on the total number of optical repeat units in the stack. Furthermore, it is known to introduce a thickness gradient such that the optical thickness of the optical repeat units changes along a thickness axis of the stack, in order to expand the spectral width of the first order reflectance band 100. The reflective power (determined by peak reflectance and bandwidth) of the higher order bands generally decreases with increasing order number.

The higher order reflectance bands can be undesirable in some applications. For example, if a visibly transparent infrared-reflecting film is desired for solar control in vehicle or architectural window applications, such that $\lambda_0$ is greater than about 800 nm, one or more higher order reflectance bands can appear in the visible region and impart an undesirable color that changes with viewing direction.

A number of techniques for suppressing at least some of the higher order reflectance bands are known.

In one known approach, the so-called "f-ratio" of the quarterwave stack is controlled to a value different than 50% by making one of the optical repeat unit component layers (H or L) optically thicker than the other (L or H, respectively) throughout the stack. Although this approach can suppress some higher order reflectance bands, it cannot suppress the second, third, and fourth orders simultaneously and is thus of limited applicability.

The second, third, and fourth orders are collectively significant because it is often desirable to reflect light in a wide first-order band extending from just beyond the visible (i.e., starting between about 700 and 800 nanometers) to about 2000 nanometers. Reflection bands beyond $4^{th}$ order will generally fall in the UV portion of the spectrum and thus not present any coloration problem in the human visible spectrum (about 400 to 700 nanometers). Although a $5^{th}$ order reflection for a $1^{st}$ order band at 2000 nanometers will appear at 400 nanometers, such reflections are usually very weak and, being disposed at the edge of the visible where the sensitivity of the human eye is poor, generally go unnoticed.

In another known approach, the optical thickness sequence of the layers is modified such that the number of individual layers in each optical repeat unit is increased from two to six. See U.S. Pat. No. 5,360,659 (Arends et al.). The six layers still alternate between the H and L component materials, but are arranged in relative optical thicknesses of 7:1:1:7:1:1. Such a structure suppresses second, third, and fourth order reflections.

In yet another known approach, a third optical material (referred to herein as "M") is introduced having a particular refractive index intermediate that of H and L. See U.S. Pat. No. 5,103,337 (Schrenk et al.). See also U.S. Pat. No. 3,247,392 (Thelen). Further, the individual layers are arranged in each optical repeat unit in the order HMLM with relative optical thicknesses of ⅓:⅙:⅓:⅙ respectively, and the refractive indices are chosen to have the relationship $$n_M = \sqrt{n_H n_L} \qquad \text{Eq. (1)}$$

This approach also suppresses second, third, and fourth order reflections.

There is a continuing need for still more multilayer film constructions to be made available to the optical film designer, including constructions that can suppress the higher order reflections.

BRIEF SUMMARY

The present application discloses multilayer films having a unique arrangement of individual layers within the optical repeat units of a multilayer stack. Each of a plurality of optical repeat units comprises six individual layers, at least three of which have different refractive indices at a design wavelength $\lambda_0$. Individual layers that have nominally the same refractive index and physical thickness (hence, also the same optical thickness) can be given a unique arbitrary letter designation, such as "A", "B", "C", or "D". These layers are arranged in a six-layer optical repeat unit in the order CACDBD, or a cyclic permutation thereof, where the A and B layers are each thicker than the C and D layers.

Advantageously, the thicknesses and refractive indices of the layers in such a multilayer stack can be selected to suppress the second, third, and fourth order reflections. One technique for determining such a selection comprises defining a refractive index function $f(X)$ for the optical repeat unit, where X is the displacement in optical thickness along the optical repeat unit, and the function value $f$ is the refractive index at that displacement. The function $f$ is then Fourier analyzed, and the thicknesses and refractive indices of the individual layers are adjusted or otherwise selected such that three consecutive Fourier coefficients become zero. If the second, third, and fourth order Fourier coefficients are zero—and provided the optical thickness of the entire optical repeat unit is maintained at $\lambda_0/2$—a multilayer film composed of optical repeat units so defined will reflect light at the design wavelength $\lambda_0$ but will suppress reflection at least at the second, third, and fourth order harmonics ($\lambda_0/2$, $\lambda_0/3$, and $\lambda_0/4$).

In some embodiments, the A and D layers can have the same refractive indez (and can be composed of the same material). Alternatively, the B and C layers can have the same refractive index (and can be composed of the same material). In either of those cases, the optical repeat unit can be composed of only three optically distinct materials rather than four, even though it still may be made up of the six individual layers CACDBD (or cyclic permutations thereof).

In other embodiments, the 6-layer optical repeat unit can be composed of four optically distinct materials, corresponding to the four layer types A, B, C, D. In a subset of these embodiments, a closed-form solution for optical thickness of the individual layers can be obtained if the optical materials are selected such that the average refractive index of the thick A and B layers equals the average refractive index of the thin C and D layers, or, equivalently, such that $(n_A+n_B)=(n_C+n_D)$, where $n_A>n_D>n_C>n_B$. Each C layer in the optical repeat unit has an optical thickness $t_C$, and each D layer has an optical thickness $t_D$, and, to satisfy symmetry conditions, $t_C=t_D$. The A layer in the optical repeat unit has an optical thickness $t_A$ and the B layer has an optical thickness $t_B$, and $t_A=t_B$ also to satisfy symmetry conditions. The closed-form relationship that makes the second, third, and fourth order Fourier coefficients zero, and that suppresses second, third, and fourth-order reflections in the multilayer film, is then:

$$\frac{3\pi X_3}{2} = \pi - \arcsin\left(\frac{-\Delta n_{DC}}{2\Delta n_{AB} + \Delta n_{DC}}\right), \quad \text{Eq. (2)}$$

where $X_3=t_A/(t_A+2t_C)=t_B/(t_B+2t_D)$, where $\Delta n_{DC}=n_D-n_C$, and where $\Delta n_{AB}=n_A-n_B$.

BRIEF DESCRIPTION OF THE DRAWINGS

Throughout the specification reference is made to the appended drawings, wherein.

DETAILED DESCRIPTION OF THE ILLUSTRATIVE EMBODIMENTS

Figure 2A:
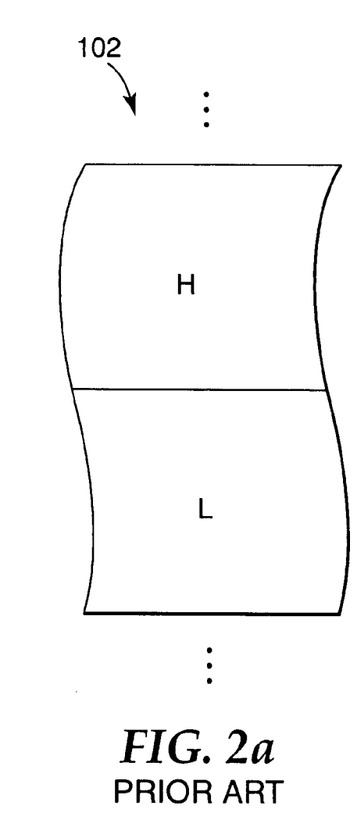
FIGS. 2a–c are partial sectional views of several PRIOR ART optical repeat units used in multilayer optical films.
Figure 2B:
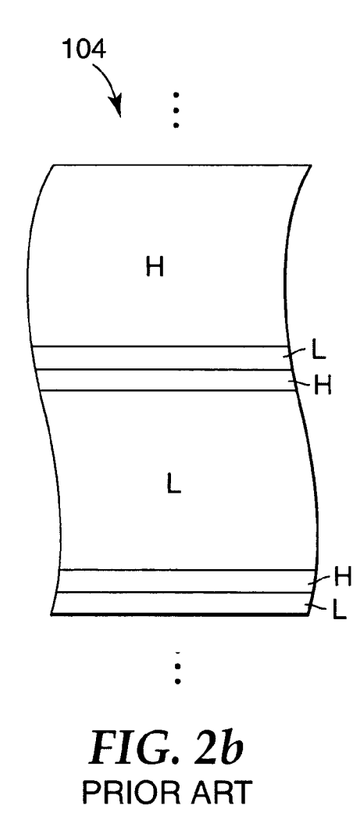
Figure 2C:
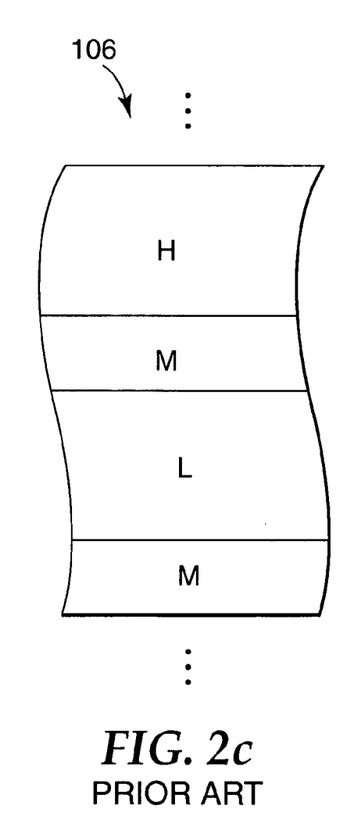

Turning now to FIGS. 2a–d, depicted there for a better understanding of the disclosed multilayer films and their relation to the prior art, are partial cross-sectional representations of the optical repeat units of three known multilayer constructions side-by-side with such a representation of the disclosed construction. In these figures the layer thicknesses, which of course are greatly magnified, are scaled to represent optical thickness rather than physical thickness. A single optical repeat unit is shown in each case. In FIG. 2a, a simple two-component quarter-wave stack 102 has one H layer and one L layer. As mentioned above, such a construction provides suppression of even order reflections but not odd order reflections. In FIG. 2b, a six-layer two-component stack 104 described above in connection with '659 Arends et al. is shown. Only two component materials, H and L, are needed, but they must be arranged in relative optical thickness in a 7/18, 1/18, 1/18, 7/18, 1/18, 1/18 repeating sequence (fractions of the optical repeat unit) if $2^{nd}$ through $4^{th}$ order reflections are to be suppressed. In FIG. 2c, the four-layer three-component stack 106 described above in connection with '337 Schrenk et al. is shown. In this embodiment a third component material "M" is required that has the refractive index relationship provided in Equation 1 above, and further the layers must be arranged in relative optical thickness in a 1/3, 1/6, 1/3, 1/6 sequence (also fractions of the optical repeat unit) as shown, if the higher order reflections are to be suppressed.

Figure 2D:
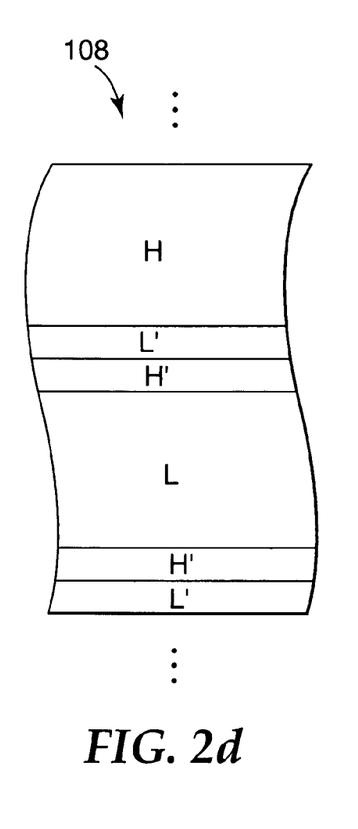
FIG. 2d is a partial sectional view of an optical repeat unit as described herein.

FIG. 2d depicts a multilayer stack 108 having an alternative optical repeat unit construction that, as described below, is likewise capable of suppressing at least $2^{nd}$, $3^{rd}$, and $4^{th}$ order reflections. This construction utilizes three or four distinct optical components, of differing refractive index at the design wavelength $\lambda_0$, arranged in a six-layer optical repeat unit. The additional components are labeled L' and H' in FIG. 2d, where $n_H>n_{H'}>n_{L'}>n_L$. Note however that in some embodiments, $n_H$ can equal $n_{H'}$, and in some other embodiments $n_L$ can equal $n_{L'}$. (Alternative labeling conventions are of course also possible, e.g., materials A B C D, where $n_A>n_D>n_C>n_B$. In that event A=H, D=H', C=L', and B=L.) In contrast to the constructions of FIGS. 2b–c, the optical thicknesses of the layers required to suppress the higher order reflection bands is not a single fixed sequence, but rather is a function of the refractive indices of the three or four optical materials. Further, the additional degree(s) of freedom provided by the third (and, when present, the fourth) optical component material permit(s) greater flexibility in the refractive index relationship between the materials than is offered by Equation (1) above.

The multilayer construction of stack 108 (FIG. 2d) provides the optical film designer with an infinite set of designs capable of higher order suppression, which infinite set spans a design gap between the limits of the FIG. 2b construction and the FIG. 2c construction. At one limit, where component L' becomes L and component H' becomes H, then $n_L=n_L$ and $n_{H'}=n_H$, and the construction reduces to the two-component six-layer design of FIG. 2b. At the other limit, where L' and H' become indistinguishable from each other such that $n_L=n_{H'}$, the construction reduces to the three-component four-layer construction of FIG. 2c. Importantly, however, an infinite set of useful stack designs between these limits is available which has not heretofore been known or appreciated.

The relationships of optical thickness and refractive index needed to suppress at least $2^{nd}$, $3^{rd}$, and $4^{th}$ order reflections are discussed in connection with FIGS. 3a–c. In those figures, refractive index is plotted on the vertical axis and displacement or position X in the optical repeat unit is plotted on the horizontal axis. The parameter X is given in optical thickness, i.e., the aggregate of physical thickness times the respective refractive index of the individual layers in the stack, and is shown between the limits of 0 and 2T, 2T being the overall optical thickness of the optical repeat unit. The three refractive index functions 114, 116, 118 correspond to multilayer stacks 104, 106, 108 respectively. Only one full period (corresponding to one optical repeat unit) is shown in each case, with the understanding that it can repeat tens or hundreds of times in typical multilayer films, with or without a thickness gradient to widen the reflection band. The functions 114 and 116 have been shifted along the X-axis for convenience so that they exhibit reverse symmetry with respect to the midpoint of the unit cell, i.e. at position X=T. Also, the labels A, B, C, (and D in the case of functions 114 and 118), rather than the H, L, M, H', and L' labels of FIG. 2, have been added next to each function in FIGS. 3a–c to identify the individual layers in the unit cells for ease of discussion below. Arbitrarily, the relatively thick layer of relatively high refractive index is labeled "A", and relatively thick layer of relatively low refractive index is labeled "B", and the other layers are labeled C and D as shown. Note that no particular relationship is intended between identical labels used for the different refractive index functions. For example, $n_C$ for function 116 is shown as the average of $n_A$ and $n_B$, but $n_C$ for function 118 is shown as less than the average of $n_A$ and $n_B$ for function 118.

Function 114 (FIG. 3a) is defined by two distinct refractive indices $n_A$, $n_B$, and six distinct layers within the optical repeat unit, where the two thicker layers are set to a common optical thickness $t_A=t_B=X_1$ and the remaining four thinner layers are set to a common optical thickness $(T-X_1)/2$. Dashed line 114a represents the average of $n_A$ and $n_B$.

Function 116 (FIG. 3b) is defined by three distinct refractive indices $n_A$, $n_B$, $n_C$, and four distinct layers (one of which is shown split between the beginning and end of the optical repeat unit), where the A and the B layers are set to a common optical thickness $t_A=t_B=X_2$, and the two C layers are set to a common optical thickness $(T-X_2)$. Dashed line 116a represents the average of $n_A$ and $n_B$.

Function 118 (FIG. 3c) is defined in its most generalized form by four distinct refractive indices $n_A$, $n_D$, $n_C$, $n_B$, and six distinct layers, although the two relatively thin, low index C layers can be nominally identical, and the two relatively thin, high index D layers can be nominally identical. As before, dashed line 118a represents the average of $n_A$ and $n_B$. Though shown in the order CACDBD, the individual layers can be arranged in other cyclic permutations as well, such as ACDBDC, CDBDCA, DBDCAC, and so on.

For this function, in general, the optical thickness of the A layer can be different from that of the B layer, and the C layers can have different optical thicknesses than the D layers. The A and B layers, however, are each optically thicker than the C and D layers, and $n_A>n_B$, and $n_D>n_C$. In special cases the A and B layers can be set to a common optical thickness $X_3$ and the remaining C, D layers can be set to a common optical thickness $(T-X_3)/2$. Also in special cases $n_A$ can equal $n_D$, or $n_D$ can equal $n_B$. In other special cases the average of $n_A$ and $n_B$ can equal the average of $n_C$ and $n_D$.

Fourier analysis of the functions 114 and 116 confirms the relationships already known to film designers. Such an analysis assumes an infinite repetition of the depicted functions but is also valid as an approximation for a finite but large number of repetitions. The analysis treats each function $f(X)$ as a refractive index waveform and calculates the Fourier coefficients $a_n$, $b_n$ of the waveform:

$$f(X) = \sum_{n=0}^{\infty} a_n \cos\left(\frac{2\pi nX}{\Lambda}\right) + \sum_{n=0}^{\infty} b_n \sin\left(\frac{2\pi nX}{\Lambda}\right) \quad \text{Eq. (3)}$$

where $$a_n = \frac{\int_0^{\Lambda} f(X)\cos\left(\frac{2\pi nX}{\Lambda}\right) dX}{\int_0^{\Lambda} dX} \quad \text{Eq. (4)}$$

and $$b_n = \frac{\int_0^{\Lambda} f(X)\sin\left(\frac{2\pi nX}{\Lambda}\right) dX}{\int_0^{\Lambda} dX}. \quad \text{Eq. (5)}$$

Figure 3A:
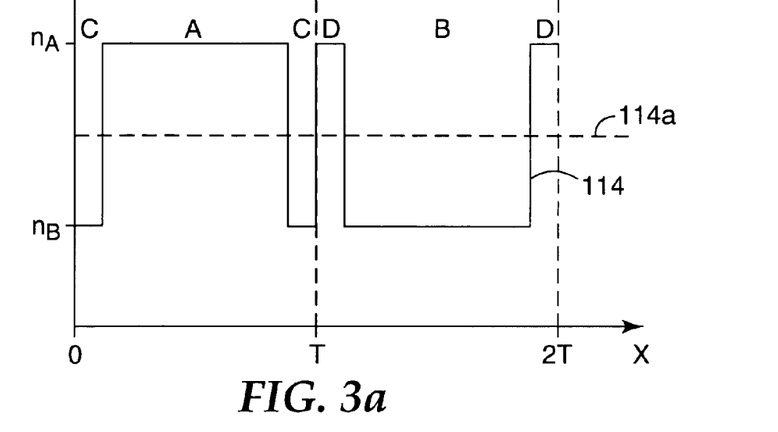
FIGS. 3a–c show graphs of refractive index versus position along the thickness axis of an optical repeat unit.
Figure 3B:
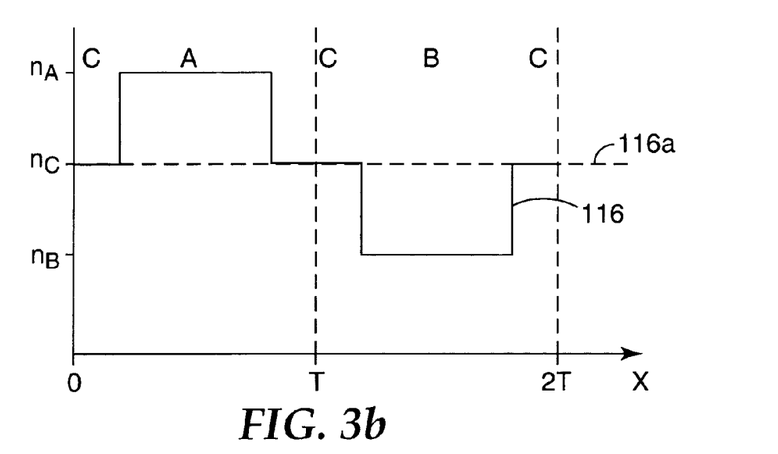
Figure 3C:
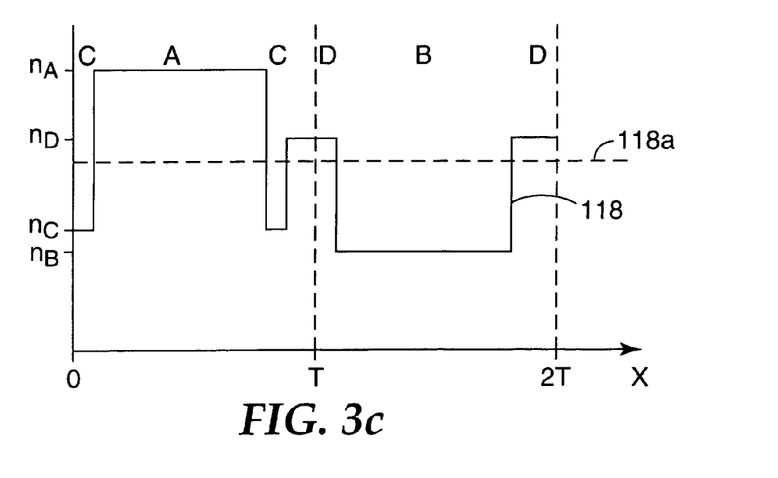

The symbol $\Lambda$ represents the optical repeat length, which is set to 2T as shown in FIG. 3. In general, the Fourier series of a refractive index function is composed of sines and cosines.

For the analysis here, it is sufficient to realize that if the Fourier coefficients of a given order number are zero, then the reflective power in that order is also zero, within an accuracy of about 1% or less. By using a single Fourier coefficient $c_n$ defined by $$c_n = \sqrt{a_n^2 + b_n^2}, \quad \text{Eq. (6)}$$

the condition for suppression of second order reflections reduces to $c_2=0$, the condition for suppression of third order reflections reduces to $c_3=0$, and so on.

In order to make the calculation of the Fourier coefficients simpler and for comparison purposes, the highest refractive index $n_H$ in each case can be set equal to 1, and the lowest refractive index $n_L$ can be set equal to −1. In this manner, all reflective powers can be judged relative to a square index waveform of unit amplitude, i.e. a standard quarter-wave stack. Also, the period 2T can be set equal to 2 by arbitrarily setting T=1. Using this analysis, the function 114 (FIG. 3a) has zero values for all even-order Fourier coefficients ($c_2=c_4=c_6=\ldots=0$). However, function 114 has the following value for its third order Fourier coefficient, where $X_1=t_A=t_B$:

$$c_3 = -\frac{4\left(1 + 2\sin\left(\frac{3X_1\pi}{2}\right)\right)}{3\pi}, \quad \text{Eq. (7)}$$

which equals zero only if $$\sin\left(\frac{3X_1\pi}{2}\right) = -0.5. \quad \text{Eq. (8)}$$

There are an infinite number of solutions, unless we add the additional constraint from FIG. 3a that $0<X_1<1$. That constraint yields the single solution $$\frac{3\pi X_1}{2} = \pi - \arcsin(-1/2), \quad \text{Eq. (9)}$$

or $$X_1 = \frac{7}{9}. \quad \text{Eq. (10)}$$

This defines the thick layers of the 711711 repeat structure of the prior art, and the remaining thin layers have relative optical thicknesses of 1/9. The above analysis confirms that the 711711 prior art multilayer structure will exhibit no second, third, or fourth order reflection bands (as well as no higher even order reflection bands).

For function 116, in the first order approximation to which the Fourier analysis is valid, the refractive index $n_C$ is set to be the numerical average of $n_A$ and $n_B$ (i.e., $n_C=(n_A+n_B)/2$). This differs from the geometric average (i.e., $n_C=\text{sqrt}(n_A \cdot n_B)$) relationship taught in U.S. Pat. No. 5,103,337 (Schrenk et al.). The approximation is accurate, however, to 0.3%, or an error in $n_C$ of 0.0048, for a fairly typical case for polymeric materials where $n_A=1.75$ and $n_B=1.50$. The relative reflective powers of the various higher order peaks predicted by a Fourier analysis are also accurate to about the same degree.

A Fourier analysis of function 116 similar to that of function 114 also yields zero values for all even-order Fourier coefficients ($c_2=c_4=c_6=\ldots=0$) as a result of the symmetry of function 116. If one also requires that the third-order Fourier coefficient $c_3$ also be zero, then the optical thickness $X_2$ ($=t_A=t_B$) must satisfy the following relationship:

$$\frac{3\pi X_2}{2} = \pi, \quad \text{Eq. (11)}$$

or $$X_2 = \frac{2}{3}, \quad \text{Eq. (12)}$$

yielding the familiar 1/3, 1/6, 1/3, 1/6 repeat structure of the prior art. Hence the Fourier analysis confirms that the HMLM prior art multilayer structure will exhibit no second, third, or fourth order reflection bands (as well as no higher even order reflection bands).

Turning now to function 118 in FIG. 3c, it has now been found that a generalized six-layer stack corresponding to such a function can be made, and can, if desired, be designed to suppress three consecutive higher order reflections such as the second, third, and fourth order, while reflecting light in the first order at $\lambda_0$. Various parameters defining function 118 can typically be selected or otherwise adjusted, such as the physical thicknesses and/or the refractive indices of the different layer types A, B, C, D. The degrees of freedom offered by this adjustability, within the constraints discussed above generally with respect to function 118, together with the condition that the optical repeat unit have an optical thickness of one-half of the design wavelength $\lambda_0$ to be reflected, can be used to suppress three consecutive higher order reflections. This can be accomplished by starting with a set of initial conditions for parameters defining function 118, computing the reflectivity of the corresponding optical repeat unit at optical wavelength $\lambda_0$ and at three consecutive higher orders such as $\lambda_0/2$, $\lambda_0/3$, and $\lambda_0/4$, and systematically adjusting the parameters to find a set of parameter values where the reflectivity at such higher orders is sufficiently small for the intended application (i.e., zero for purposes of this application). The suppression of the three consecutive higher order reflections can also be accomplished by finding a set of parameter values for function 118 that makes three successive Fourier coefficients $c_n$ (see Eq. 6 together with Eqs. 3–5 above) zero.

Figure 4A:
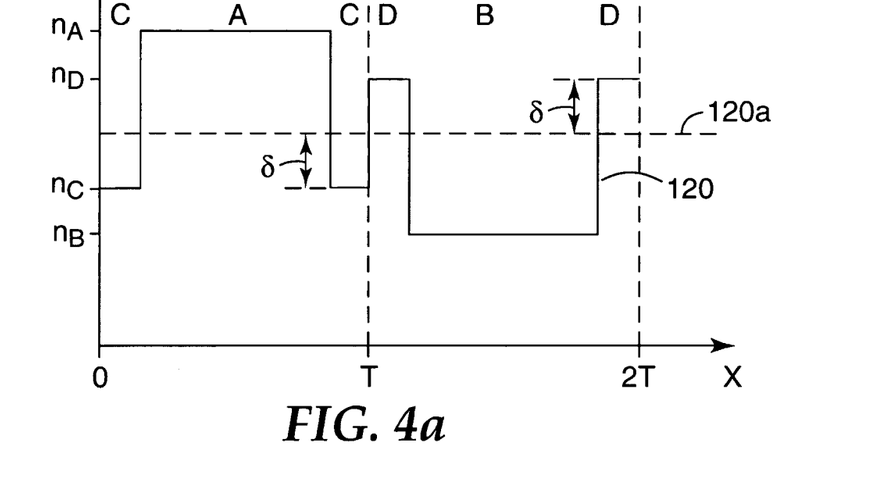
FIGS. 4a–b show additional graphs of refractive index functions, these functions being special cases of the more general refractive index function shown in FIG. 3c.

A special case of the generalized refractive index function 118 is shown in FIG. 4a as refractive index function 120. Here again, the individual layers are arranged in a cyclic permutation of CACDBD, and layers A and B each have optical thicknesses greater than the C and D layers, and $n_A>n_B$, and $n_D>n_C$. In function 120, the following additional conditions are also met:

$$n_A+n_B=n_C+n_D \quad \text{Eq. (13)}$$

$$t_A=t_B=X_3 \quad \text{Eq. (14)}$$

$$t_C=t_D=(T-X_3)/2 \quad \text{Eq. (15)}$$

In other words, the average refractive index of the A and B layers (shown as line 120a in FIG. 4a) equals the average refractive index of the C and D layers, the optical thickness of the A layer equals that of the B layer, and the optical thickness of the C and D layers are also equal to each other. For convenience, we normalize the optical thickness such that T=1, and we define a normalized parameter δ (depicted in FIG. 4a) as a measure of how much the refractive indices $n_C$ and $n_D$ differ from the average refractive index:

$$\delta = \frac{2n_D - (n_A + n_B)}{n_A - n_B} = \frac{(n_A + n_B) - 2n_C}{n_A - n_B} \quad \text{Eq. (16)}$$

Thus, as $n_D$ approaches $n_A$ (and as $n_C$ approaches $n_B$), δ approaches 1. On the other hand as $n_D$ and $n_A$ approach each other (and as they approach the average refractive index 120a), δ approaches 0.

The above conditions impose a symmetry upon function 120 with respect to the optical thickness position X=T and with respect to the average refractive index. Because of this symmetry, all the even-order Fourier coefficients for function 120, from Eq. 3 above, are zero ($c_2=c_4=c_6=\ldots=0$). If we also require that the third order coefficient $c_3$ for function 120 equals zero, we obtain the following relationship:

$$\frac{3\pi X_3}{2} = \pi - \arcsin\left(\frac{-\delta}{1+\delta}\right). \qquad \text{Eq. (17)}$$

Note that in the limit as $\delta=1$, then the four-component system degenerates into a two-component system with $n_p=n_A$ and $n_C=n_B$, and Eq. (17) reduces to that of Eq. (9), yielding the familiar 711711 multilayer construction. At the opposite extreme as $\delta=0$, the four-component system degenerates into a three-component system with $n_D=n_C=n_M$, and Eq. (17) reduces to that of Eq. (11), yielding the familiar HMLM multilayer construction.

But between those limits, i.e. for $0<\delta<1$, an entire family of four-component multilayer stacks are available (with six optical layers per optical repeat unit) that exhibit no second, third, or fourth order reflection bands, as well as no higher even order reflection bands.

Figure 4B:
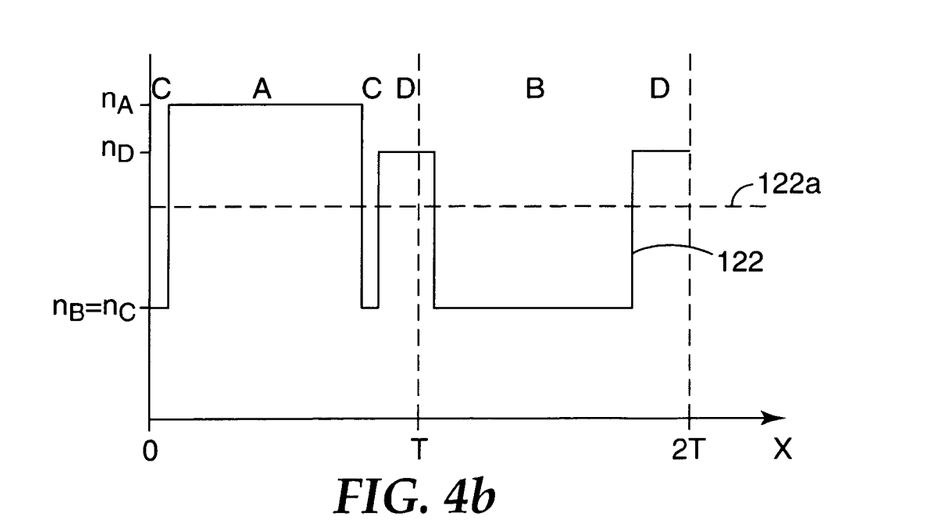

Turning now to FIG. 4b, we see there another refractive index function 122 which represents another special case of the more general waveform 118 of FIG. 3c. Dashed line 122a represents the average of refractive indices $n_A$ and $n_B$. As before, the individual layers associated with function 122 are arranged in a cyclic permutation of CACDBD, and layers A and B each have optical thicknesses greater than the C and D layers, and $n_A>n_B$, and $n_D>n_C$. In function 122, the following additional conditions are also met:

$$n_B=n_C \qquad \text{Eq. (18)}$$

$$n_A \neq n_D \qquad \text{Eq. (19)}$$

In other words, the thin low index layers have the same refractive index as the thick low index layer. This may come about by using the same optical material in the formation of the B and C layers, in which case the optical repeat unit can consist essentially of three distinct optical materials: one for the A layer, another for the B and C layers, and yet another for the D layers. (An analogous situation can arise where $n_A=n_D$, and $n_B \neq n_C$, where one optical material is used for the A and D layers, another optical material is used for the B layer, and yet another optical material is used for the C layer.) In this regard, it may be possible for two optical materials of the same chemical composition to be distinct, if morphology differences between thicker and thinner layers of such composition result in unequal refractive indices at the design wavelength. Such morphology differences may arise during vapor deposition of inorganic materials or during stretching of multilayer polymeric films.

Refractive index function 122, so defined, lacks symmetry of the kind described above with respect to refractive index function 120. Nevertheless, the general equation for the Fourier coefficients $c_n$ (Eq. 6 above) can be shown to be, for refractive index function 122, $$c_n = \frac{2[\sin(n\pi) - 2\sin(n\pi t_A/2) + (1+h)\{\sin(n\pi(t_C + 0.5*t_A)) - \sin(n\pi(t_D + t_C + 0.5*t_A))\}]}{n\pi} \qquad \text{Eq. (20)}$$

where the parameter h is $$h = \frac{2n_D - (n_A + n_B)}{n_A - n_B}, \qquad \text{Eq. (21)}$$

where the optical thickness $t_B$ of the thick low index B layer is computed from the other optical thicknesses as $$t_B = 2T - t_A - 2t_C - 2t_D, \qquad \text{Eq. (22)}$$

and where the optical thicknesses $t_A$, $t_B$, $t_C$, $t_D$ are scaled or normalized such that $T=1$. Despite the lack of symmetry, for a given value of h, the three independent parameters $t_A$, $t_C$, $t_D$ can be adjusted to simultaneously zero three higher order reflections, such as the $2^{nd}$, $3^{rd}$, and $4^{th}$ orders, even though the asymmetry does not in general permit an infinite number of higher even order reflections to be suppressed.

As a specific example of the asymmetric type exemplified by function 122, h was selected to be 0.5. A set of initial parameters $t_A$, $t_B$, $t_C$, $t_D$ was selected, and three of these parameters were then systematically adjusted to find values where the computed $2^{nd}$, $3^{rd}$, and $4^{th}$ order Fourier coefficients were all zero. The resulting normalized optical thickness values were:

$t_A=0.7684$ $t_B=0.7436$ $t_C=0.0895$ $t_D=0.1545$, and these resulted in a stack whose computed reflectivity at $2^{nd}$, $3^{rd}$, and $4^{th}$ orders was also zero.

As another specific example of the asymmetric type exemplified by function 122, h was selected to be 0.3. A set of initial parameters $t_A$, $t_B$, $t_C$, $t_D$ was selected, and three of these parameters were then systematically adjusted to find values where the computed $2^{nd}$, $3^{rd}$, and $4^{th}$ order Fourier coefficients were all zero. The resulting normalized optical thickness values were:

$t_A=0.7594$ $t_B=0.7214$ $t_C=0.0739$ $t_D=0.1857$, and these resulted in a stack whose computed reflectivity at $2^{nd}$, $3^{rd}$, and $4^{th}$ orders was also zero. Of course, this example and the one above where $h=0.5$ are readily applicable to any desired wavelength of interest $\lambda_0$ simply by applying a scaling factor to the four computed normalized thickness values to arrive at the actual optical thickness values for the individual layers in the optical repeat units.

As shown above, the thickness and refractive index values in the six-layer repeat structure depicted generally in FIG. 2d can be selected to simultaneously suppress three successive higher order harmonics. However, due to dispersion, the refractive index at each of the higher order wavelengths may differ from the value at the design wavelength $\lambda_0$, making it difficult to exactly suppress all three orders simultaneously. Nevertheless, the six layers in the repeat structure can be adjusted to adequately suppress all three orders. Relative suppression of the three orders may depend on product specifications.

Multilayer stacks described herein can be composed of conventional inorganic materials, such as are sequentially deposited on a glass or other substrate in a vacuum environment. Examples of such inorganic materials include but are by no means limited to $TiO_2$, $SiO_2$, and mixtures thereof. Other materials known to those skilled in the art of inorganic vacuum deposition are also suitable. Multilayer stacks described herein can alternatively be composed of organic materials such as polymers. Common examples include polyethylene naphthalate (PEN), co-PEN, polyethylene terephthalate (PET), co-PET, polymethyl methacrylate (PMMA), and syndiotactic polystyrene (sPS). Known fabrication techniques for such polymeric multilayer stacks include coextrusion of the polymers in a multilayer feedblock, such as described in U.S. Patent Publication 2001-0022982-A1 (Neavin et al.). The coextruded films can be stretched uniaxially or biaxially to modify the thickness and/or refractive indices of one or more polymer layers in one or more orthogonal directions. Reference is made to U.S. Pat. No. 5,882,774 (Jonza et al.), including the discussion therein of selecting out-of-plane (z-index) refractive index relationships to achieve desired reflectivity of p-polarized light at oblique incidence angles. This includes the technique of selecting the z-axis refractive indices of adjacent optical layers to substantially match, or to differ by an amount such as 0.5 or 0.25 or less of an in-plane refractive index difference between such optical layers, or selecting the z-axis refractive index difference to be of opposite sign relative to the refractive index difference along an in-plane axis. The multilayer design considerations disclosed herein are applicable to films in only one in-plane direction, as with reflective multilayer polarizers, or to films in two orthogonal in-plane directions. Further, the multilayer design considerations are also applicable to multilayer films, whether or not polymeric, whose optical layers are composed entirely of optical materials having isotropic refractive indices.

Sharp boundaries between layers as shown in FIGS. 2, 3, and 4 are not always achievable or necessarily desirable. It is not considered critical that sharp boundaries be maintained. A rounded rectangular wave profile can also produce the desired first order reflectivity and suppression of higher order reflectance bands. In this regard, interdiffusion between two distinct materials can occur that produces a distinct third optical layer. Optically, a mixed layer behaves as a different material than either of its components if they have differing refractive indices. Thus, one or more of the distinct optical layers shown in the disclosed embodiments can comprise a mixture or interdiffusion of materials from adjacent optical layers.

Multilayer films can be made in which all or substantially all of the optical repeat units are of one type, such as one of the types depicted in FIG. 2d, 3c, 4a, or 4b. Alternatively, a multilayer film can comprise two or more of such optical repeat unit types. Still further, hybrid films can be made which comprise one or more of the optical repeat unit types depicted in FIG. 2d, 3c, 4a, or 4b, together with one or more conventional optical repeat unit types such as those depicted in FIG. 2a, 2b, or 2c. Optical repeat units of the same type can be grouped into packets, and different packets can be separated by protective boundary layers or other optically thick transparent materials.

Throughout the present application, mathematical equations are provided. Such equations are also intended to encompass relationships where the quantity on the left-hand-side of the equals sign is not precisely equal to the quantity on the right-hand-side of the equals sign, but is close enough to achieve the desired end result in accordance with the teachings herein.

All patents and patent publications referred to herein are incorporated by reference. Although the present invention has been described in connection with reference to preferred embodiments, those of skill in the art will recognize that changes can be made in form and detail, and the scope of the invention is limited only by the full range of the claims appended hereto, including the range of protection provided under the doctrine of equivalents.

What is claimed is:

1. A multilayer reflective film comprising a plurality of six-layer optical repeat units each comprising individual layers A, B, C, D arranged in a six-layer sequence CACDBD), or a cyclic permutation thereof, the A and B layers being optically thicker than the C and D layers, and where the individual layers have refractive indices that satisfy the relationship $n_A \geq n_D > n_C > n_B$ or the relationship $n_A > n_D > n_C \geq n_B$.

2. The film of claim 1, wherein the individual layers each have isotropic refractive indices.

3. The film of claim 1, wherein at least one of the individual layers is birefringent, and wherein the refractive indices $n_A$, $n_B$, $n_C$, $n_D$ are measured along an axis in the plane of the film at a design wavelength.

4. The film of claim 3, wherein the individual layers have refractive indices measured along an axis perpendicular to the plane of the film that are substantially matched.

5. The film of claim 1, wherein at least one of the optical repeat units has an optical thickness of one-half of a design wavelength $\lambda_0/2$, so as to reflect light at the design wavelength $\lambda_0$.

6. The film of claim 5, wherein $\lambda_0$ is between about 700 and 2000 mm.

7. The film of claim 5, wherein the thicknesses and refractive indices of the individual layers are selected to suppress reflection of light at least at wavelengths of $\lambda_0/2$, $\lambda_0/3$, and $\lambda_0/4$.

8. The film of claim 5, wherein the individual layers have refractive indices that satisfy the relationship $n_A > n_D > n_C > n_B$.

9. The film of claim 8, wherein the refractive indices of the individual layers further satisfy the relationship $n_A + n_B = n_C + n_D$, wherein the A layer has an optical thickness $t_A$ and the B layer has an optical thickness $t_B$, and $t_A = t_B$; wherein each C layer has an optical thickness $t_C$ and each D layer has an optical thickness $t_D$, and $t_C = t_D$; and wherein the relationship $$\frac{3\pi X_3}{2} = \pi - \arcsin\left(\frac{-\Delta n_{DC}}{2\Delta n_{AB} + \Delta n_{DC}}\right)$$

is satisfied, where $X_3 = t_A/(t_A + 2t_C)$, where $\Delta n_{AB} = n_A - n_B$, and where $\Delta n_{DC} = n_D - n_C$.

10. The film of claim 5, wherein the individual layers have refractive indices that satisfy the relationship $n_A = n_D > n_C > n_B$ or the relationship $n_A > n_D > n_C = n_B$.

11. The film of claim 1, wherein the individual layers are composed of polymeric materials.

12. The film of claim 1, wherein the layers are composed of inorganic materials.

13. The film of claim 1, wherein the optical repeat units are arranged to have a thickness profile that changes along a thickness axis of the film.

* * * * *

UNITED STATES PATENT AND TRADEMARK OFFICE
CERTIFICATE OF CORRECTION

PATENT NO. : 7,019,905 B2 Page 1 of 2
APPLICATION NO. : 10/748396
DATED : March 28, 2006
INVENTOR(S) : Michael F. Weber It is certified that error appears in the above-identified patent and that said Letters Patent is hereby corrected as shown below:

Title Page #56
Under Foreign Patent Documents, please add the following references that were cited and considered by the examiner but do not appear on the printed patent:

--WO 95/17692  08/29/1995
  WO 95/17699  08/29/1995
  WO 99/36262  07/22/1999--

Under Other Publications, please add the following references that were cited and considered by the examiner but do not appear on the printed patent:

--Born et al., Principles of Optics Electromagnetic Theory of Propagation, Interference and Diffraction of Light, Table of Contents, pp. 51-70, Pergamon Press, Oxford, 1980.

Kogelnik, Herwig, "Coupled Wave Theory for Thick Hologram Gratings", The Bell System Technical Journal, American Telephone and Telegraph Company, Vol. 48, Nov. 1969.

Schrenk et al., Nanolayer Polymeric Optical Films, Tappi Journal, pp. 169-174, June 1992.

Thelen, Alfred, Design of Optical Interference Coatings, pp. 157-176, Mc Graw-Hill Inc., New York, 1989.

Weber et al., "Giant Birefringent Optics in Multilayer Polymer Mirrors", Science, Vol. 287, 03/31/2000, pp. 2451-2456.--

Column 1,
Line 66, Delete "H,L" and insert -- H, L --, therefor.

Column 3,
Line 29, Delete "indez" and insert -- index --, therefor.

Column 5,
Line 60, Delete "$n_A$, $n_D$ $n_C$, $n_B$," and insert -- $n_A$, $n_D$, $n_C$, $n_B$, --, therefor.

UNITED STATES PATENT AND TRADEMARK OFFICE
CERTIFICATE OF CORRECTION

PATENT NO.       : 7,019,905 B2
APPLICATION NO.  : 10/748396
DATED            : March 28, 2006
INVENTOR(S)      : Michael F. Weber It is certified that error appears in the above-identified patent and that said Letters Patent is hereby corrected as shown below:

<u>Column 8,</u>
Line 58, Delete "$n_D$ and $n_A$," and insert -- $n_D$ and $n_C$ - -.

<u>Column 11,</u>
Line 52, Delete "FlG." and insert -- FIGS. --, therefor.
Line 56, Delete "FIG." and insert -- FIGS. --, therefor.
Line 58, Delete "FIG." and insert -- FIGS. --, therefor.

<u>Column 12,</u>
Line 16, In Claim 1, delete "CACDBD)," and insert -- CACDBD, --, therefor.
Line 34, In Claim 6, delete "mm." and insert -- nm. --, therefor.

Signed and Sealed this

Nineteenth Day of December, 2006

JON W. DUDAS
*Director of the United States Patent and Trademark Office*